(12) United States Patent
Hultgren

(10) Patent No.: US 12,026,815 B2
(45) Date of Patent: *Jul. 2, 2024

(54) SCROLLING WITH DAMPED OSCILLATION

(71) Applicant: Paul J. Hultgren, San Carlos, CA (US)

(72) Inventor: Paul J. Hultgren, San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,227

(22) Filed: Apr. 15, 2023

(65) Prior Publication Data

US 2023/0252705 A1    Aug. 10, 2023

Related U.S. Application Data

(63) Continuation of application No. 17/446,617, filed on Aug. 31, 2021, now Pat. No. 11,657,556.

(51) Int. Cl.
   *G06T 13/00*    (2011.01)
   *G06F 3/0485*   (2022.01)
   *G06T 7/20*     (2017.01)

(52) U.S. Cl.
   CPC ............ *G06T 13/00* (2013.01); *G06F 3/0485* (2013.01); *G06T 7/20* (2013.01)

(58) Field of Classification Search
   CPC .......... G06T 13/00; G06T 7/20; G06F 3/0485
   See application file for complete search history.

(56) References Cited

U.S. PATENT DOCUMENTS

| | | | |
|---|---|---|---|
| 9,310,955 B2 * | 4/2016 | Haswell | G06F 3/048 |
| 2003/0009493 A1 | 1/2003 | Parker et al. | |
| 2006/0055700 A1 | 3/2006 | Niles et al. | |
| 2006/0156246 A1 | 7/2006 | Williams et al. | |
| 2007/0165490 A1 * | 7/2007 | Simonian | G04B 45/0046 |
| | | | 368/223 |
| 2007/0236475 A1 | 10/2007 | Wherry | |
| 2008/0307330 A1 | 12/2008 | Louch et al. | |
| 2011/0126161 A1 * | 5/2011 | Deluca | G06F 3/0482 |
| | | | 715/850 |
| 2013/0104056 A1 | 4/2013 | Halliday et al. | |
| 2014/0208260 A1 | 7/2014 | Kawahara et al. | |
| 2015/0135133 A1 | 5/2015 | Munoz-Bustamante | |
| 2016/0267664 A1 * | 9/2016 | Davis | G06T 13/80 |
| 2018/0336043 A1 * | 11/2018 | Walkin | G06F 3/04886 |

OTHER PUBLICATIONS

Non-Final Office Action dated Feb. 2, 2023 for U.S. Appl. No. 17/446,617.
Notice of Allowance dated Mar. 29, 2023 for U.S. Appl. No. 17/446,617.

* cited by examiner

*Primary Examiner* — Terrell M Robinson

(57) ABSTRACT

In one embodiment, a method includes displaying one or more objects on a display device and receiving a user input corresponding to a movement along the display device. The method further includes determining a motion of each of the one or more objects on the display device. The determined motion corresponds to the user input and includes: a first motion that includes a translation of each of the objects along a particular path across at least a portion of the display device and a second motion that includes a decaying oscillatory motion of each of the objects where an amplitude of the decaying oscillatory motion decreases with time. The method also includes applying the determined motion to the one or more objects displayed on the display device.

22 Claims, 11 Drawing Sheets

SCROLLING WITH DAMPED OSCILLATION

REFERENCE TO RELATED APPLICATIONS

This application is a continuation of U.S. patent application Ser. No. 17/446,617, filed 31 Aug. 2021.

TECHNICAL FIELD

This disclosure generally relates to the display of objects on an electronic visual display.

BACKGROUND

There are a number of different types of electronic visual displays, such as for example, liquid-crystal displays (LCDs), light-emitting diode (LED) displays, organic light-emitting diode (OLED) displays, electroluminescent displays, and quantum dot displays. A display may be provided as part of a desktop computer, laptop computer, tablet computer, smartphone, wearable device (e.g., smartwatch), mobile computing device, satellite navigation device, game console, point-of-sale device, control panel or status screen in an automobile, household appliance, or other suitable computing device. A user may interact with a display via touch, stylus, mouse, touch pad, or other suitable user-interaction technique. For example, a display may include a touch sensor, and a user may interact directly with objects displayed on the display using their finger or a stylus. Additionally or alternatively, a user may interact with objects displayed on a display using a touch pad or mouse.

DESCRIPTION OF EXAMPLE EMBODIMENTS

Figure 1:
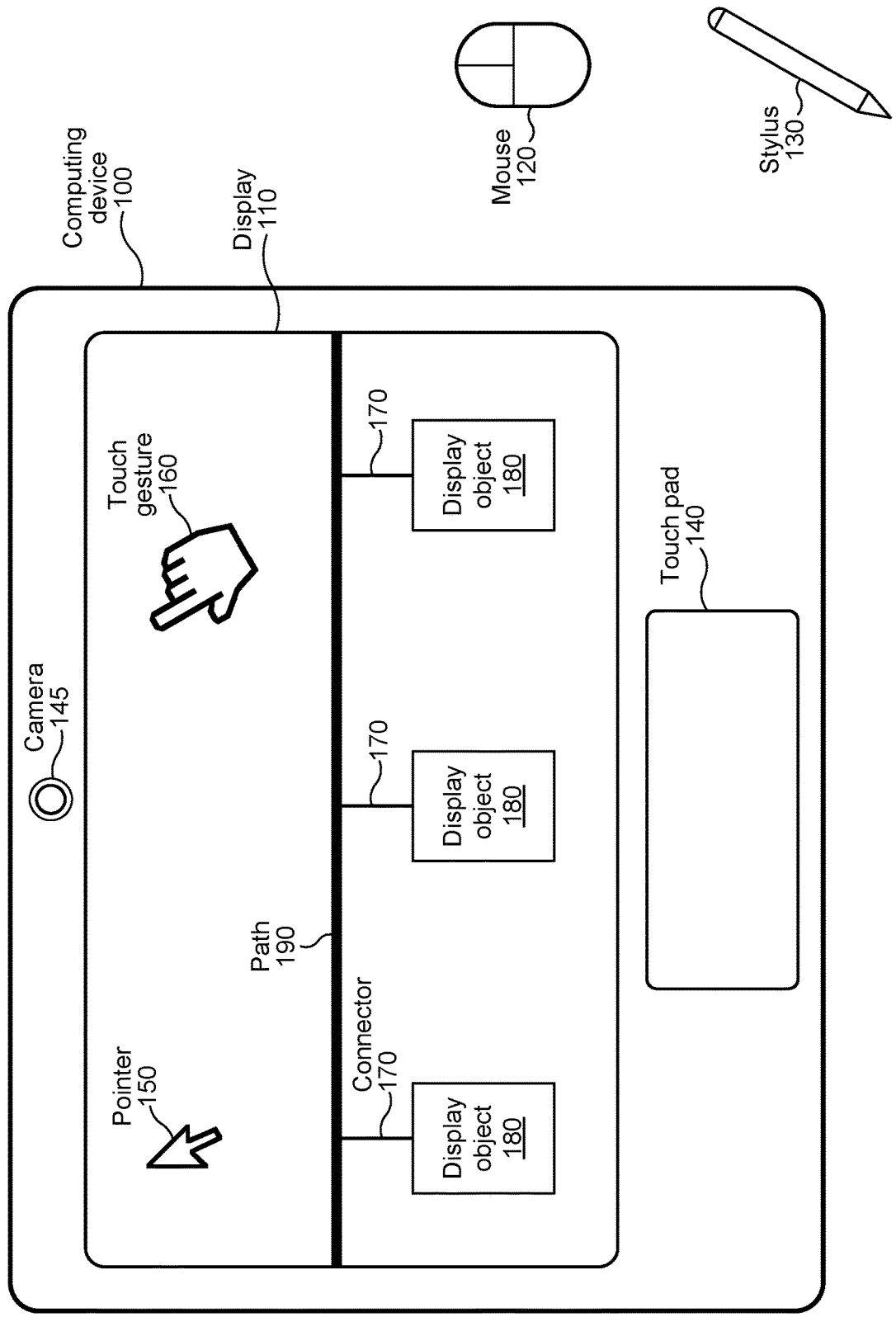
FIG. 1 illustrates an example computing device that includes a display device.
Figure 14:
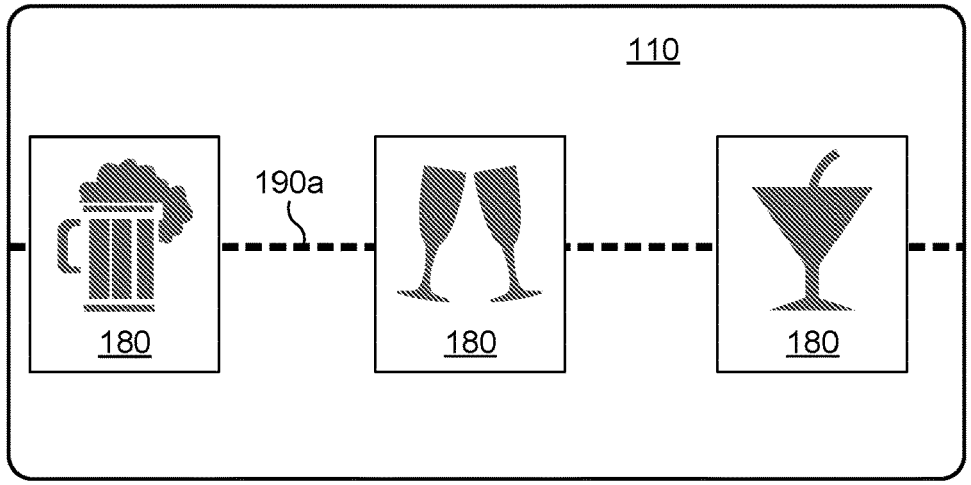

FIG. 1 illustrates an example computing device 100 that includes a display device 110. The display device 110 in FIG. 1 is part of the computing device 100, and the display device 110 may be a liquid-crystal display (LCD), a light-emitting diode (LED) display, an organic LED display, an electroluminescent display, a quantum dot display, or any other suitable display device. A display device 110 may be used for the presentation of images, text, or video and may be referred to as a display, an electronic visual display, electronic display, display screen, monitor, screen, or touch screen. The display device 110 in FIG. 1 is displaying three display objects 180. A display object 180 may include an image, text, or video and may be referred to as an object. Each object 180 in FIG. 1 is connected to a path 190 by a connector 170. A path 190 may represent a route or course along which objects 180 may travel along a display 110. A path 190 may be visible on a display 110 (as illustrated in FIG. 1), or a path 190 may not be displayed on a display 110. The path 190a in FIG. 14 is illustrated as a dashed line, which indicates that the path 190a is not visible on the display 110. The non-displayed path 190a may be present in software or memory of a computing device 110, and the non-displayed path 190a may be used by the computing device 110 to guide the motion of the objects 180. Objects 180 may be offset from a path 190 (as illustrated in FIG. 1), or objects 180 may overlap or coincide with a path 190 (as illustrated in FIG. 14). A connector 170 may be visible on a display 110 (as illustrated in FIG. 1), or a connector may not be displayed or may not be present (as illustrated in FIG. 14).

Figure 2:
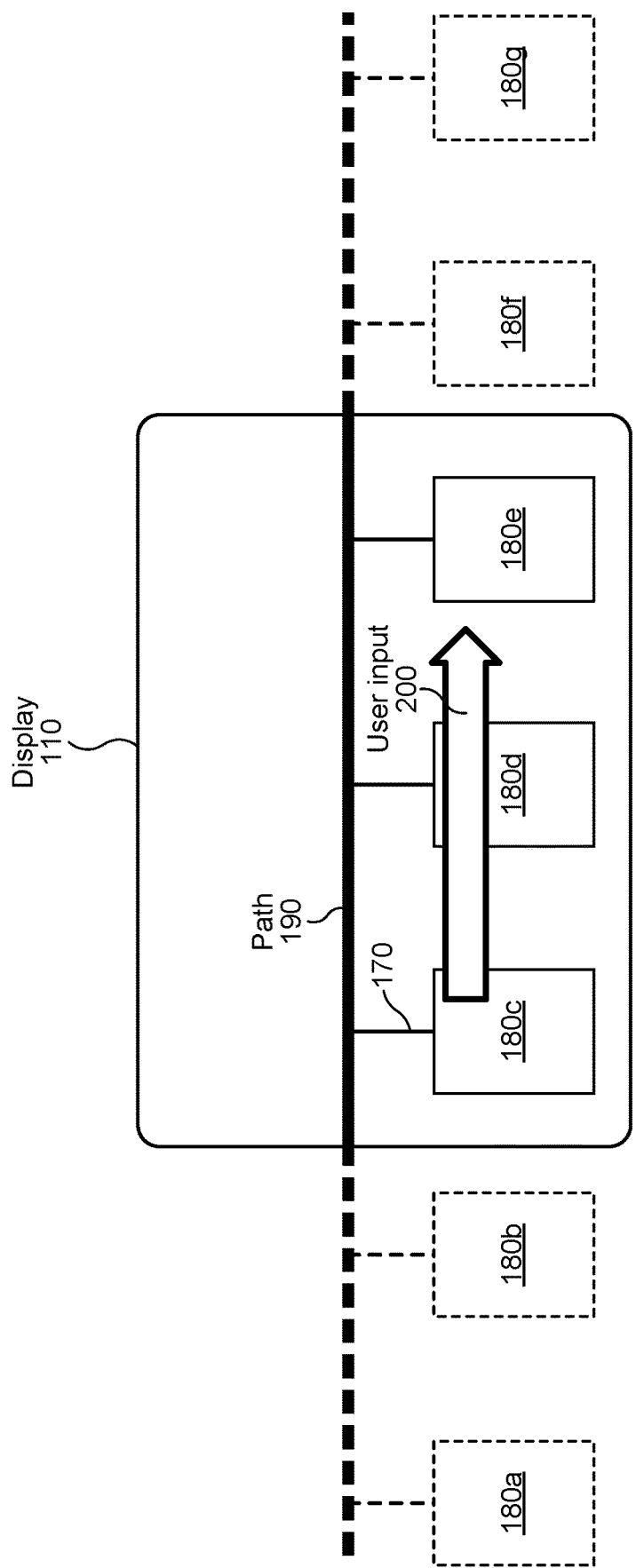
FIG. 2 illustrates an example user input applied to a display.

FIG. 2 illustrates an example user input 200 applied to a display 110. In particular embodiments, a computing device 100 may be configured to display one or more objects 180 on a display 110. In FIG. 2, the display 110 is displaying objects 180c, 180d, and 180e. The objects 180a, 180b, 180f, and 180g, which may be part of a set of objects that includes objects 180a through 180g, are not displayed in FIG. 2. These off-screen or virtual objects (180a, 180b, 180f, and 180g) may be displayed at a later time as a motion is applied to the displayed objects 180c, 180d, and 180e. For example, the user input 200 may result in a motion that moves object 180e off the display 110, and object 180b may be moved onto and shown on the display 110.

In particular embodiments, a computing device 100 may be configured to receive a user input 200, where the user input 200 corresponds to a movement along the display 110. In FIG. 2, the user input 200 applied to the display 110 corresponds to an approximately horizontal movement along the display 110 in a left-to-right direction. A user input 200 may be provided in any suitable direction and may extend across any suitable portion of a display 110. The direction of the resulting motion of the objects 180 on the display device may be determined based on the user input 200 and the path 190. For example, a left-to-right user input 200 (as illustrated in FIG. 2) may result in a motion of the objects 180 along the path 190 in a left-to-right direction, and a right-to-left user input 200 may result in a motion of the objects 180 along the path 190 in a right-to-left direction. As another example, if a user input 200 is not directed along a path 190 (e.g., a user input 200 may be curved or directed at an angle with respect to the path 190), the resulting motion of the objects 180 may be constrained to the path 190 in a direction that corresponds most closely to a direction of the user input 200.

In particular embodiments, a user input 200 may include or correspond to a movement provided by a user interacting with a display 110. The movement may include a physical movement provided by the user, where the physical movement includes a direct interaction with a display 110 (e.g., via a touch sensor) or a movement that takes place away from the display 110 (e.g., a mouse movement). A user input 200 may include a mouse movement, a touch-pad input, a stylus input, a touch-screen input, a hand movement, a head movement, an eye movement, or any other suitable movement, input, or gesture. A user input 200 that corresponds to a movement along a display 110 may include a physical movement along or a direct interaction with the display 110. For example, the display 110 may be a touch screen that includes a touch sensor, and a user may apply a touch gesture 160 in which their finger or hand moves along the display 110 while in contact with or in close proximity to the display 110. As another example, a user may use a stylus 130 that is moved along the display 110 while in contact with or in close proximity to the display 110. A user input 200 that corresponds to a movement along a display 110 may include a movement, input, or gesture that is provided by a user away from the display 110. For example, a user input 200 may be provided by a mouse 120 or a touch pad 140, where the mouse 120 or touch pad 140 may be used to guide a pointer 150. A user may use the mouse 120 to guide the pointer 150 and click on or near one of the objects 180, and the user may then provide a user input 200 by moving the pointer 150 or object 180 along the display 110 with the mouse 120. As another example, a user input 200 may include a hand movement, a head movement, an eye movement, or any other suitable movement of any suitable part of a user's body. A computing device 110 may include a camera 145 or other sensor (e.g., inertial measurement unit (IMU), such as for example, a gyroscope or accelerometer) that monitors the movement of a part of a user's body. For example, the user may wave or move a hand in a left-to-right direction to provide the left-to-right user input 200 illustrated in FIG. 2, and a camera 145 may detect the movement. Alternatively, the display 110 may be part of a virtual-reality headset that monitors the user's eye or head movement, and the user may provide the user input 200 illustrated in FIG. 2 by moving their eyes or rotating their head in a left-to-right direction.

Figure 3:
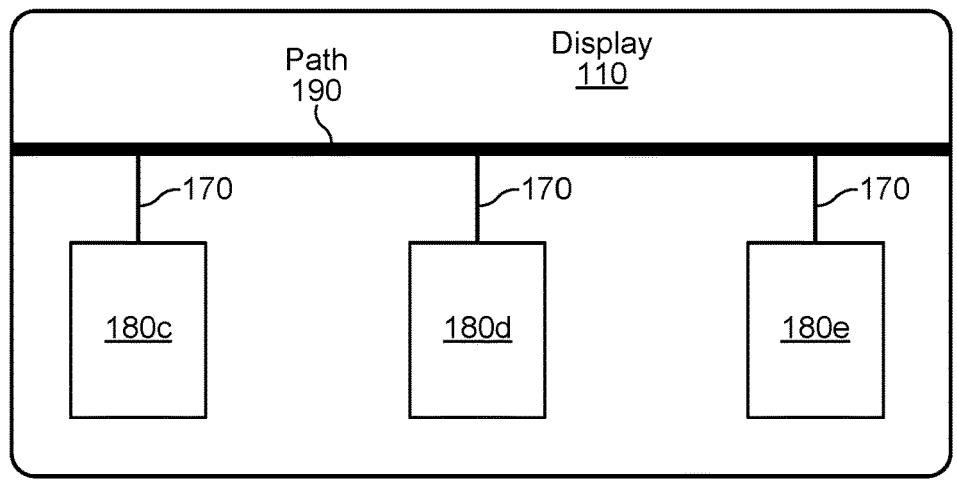
FIG. 3 illustrates an example display on which three objects are displayed.

FIG. 3 illustrates an example display 110 on which three objects are displayed. The three objects 180c, 180d, and 180e may correspond to the three objects displayed on the display 110 in FIG. 2. A user input 200 may be applied to the display 110 in FIG. 3 (e.g., a left-to-right movement similar to that illustrated in FIG. 2). In response to the user input 200, a computing device 100 may determine a motion 300 of the objects displayed on the display 110 (e.g., objects 180c, 180d, and 180e). The determined motion 300 may correspond to the user input 200 and may include (i) a first motion that includes a translation 310 of the objects 180 along a path 190 across at least a portion of the display 110 and (ii) a second motion that includes a decaying oscillatory motion 320 of the objects. A translation 310 may be referred to as a translational motion. A decaying oscillatory motion 320 may be referred to as a decaying oscillation, damped oscillatory motion, damped oscillation, decreasing oscillatory motion, or decreasing oscillation. A decaying oscillatory motion 320 may be configured so that an amplitude of the decaying oscillatory motion decreases with time. After the motion 300 is determined, a computing device 100 may apply the determined motion to the objects 180 on the display 110.

Receiving a user input 200, determining a motion 300 that includes a translation 310 and a decaying oscillatory motion 320, and applying the motion 300 to one or more objects 180 on a display 110 may be referred to as scrolling with damped oscillation. Scrolling with damped oscillation may allow a user to scroll through a set of objects 180 on a display 110 without having the full set of objects 180 displayed together at the same time. The set of objects 180 may include a greater number of objects 180 than are displayed on the display 110 at any given time. For example, the set of objects 180 may include approximately 10, 20, 50, 100, 500, 1,000, or any other suitable number of objects 180, and at any give time, less than or equal to 2, 5, 10, or 20 objects 180 may be displayed on the display 110. Scrolling with damped oscillation may also provide an interactive experience in which a user may be able to intuitively control the speed of scrolling through a set of objects 180 based on the speed or amplitude of the translation 310 or decaying oscillation 320 that results from a user input 200.

Figure 4:
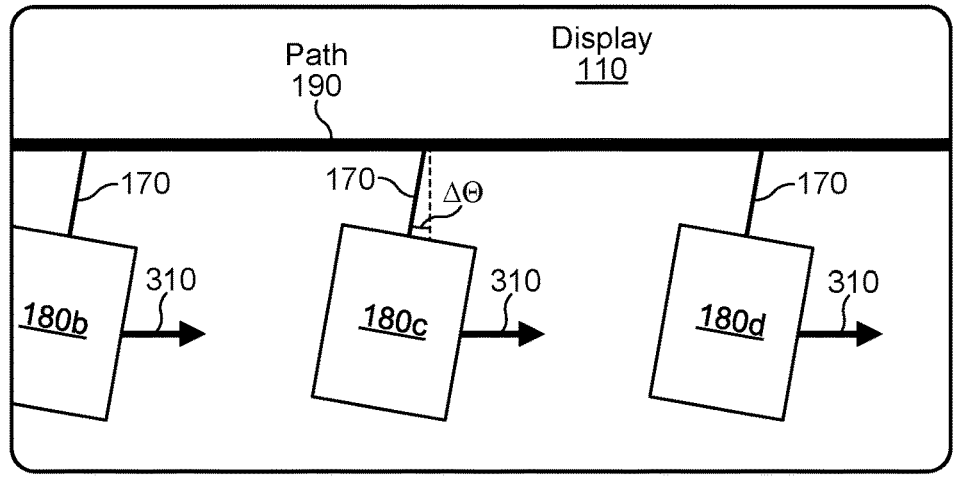
FIG. 4 illustrates an example translational motion of the objects of FIG. 3.

FIG. 4 illustrates an example translational motion 310 of the objects of FIG. 3. A translation 310 may follow along a route that corresponds to a shape or orientation of a path 190. In FIG. 4, the path 190 is a straight line having an approximately horizontal orientation, and the translation 310 of the objects 180 on the display 110 includes a corresponding horizontal left-to-right motion (as indicated by the horizontal arrows in FIG. 4 connected to the objects 180b, 180c, and 180d). The translation 310 in FIG. 4 may correspond to the user input 200 applied to the display 110 in FIG. 2. Additionally, the translation 310 in FIG. 4 may represent a "snapshot" view of an in-process translation 310 in which the objects 180b, 180c, and 180d are still moving. In FIG. 4, the translation 310 has resulted in objects 180c and 180d moving to the right. Additionally, object 180e has moved off-screen and been removed from the display 110, and object 180b has moved on-screen and been added to the display 110.

Figure 5:
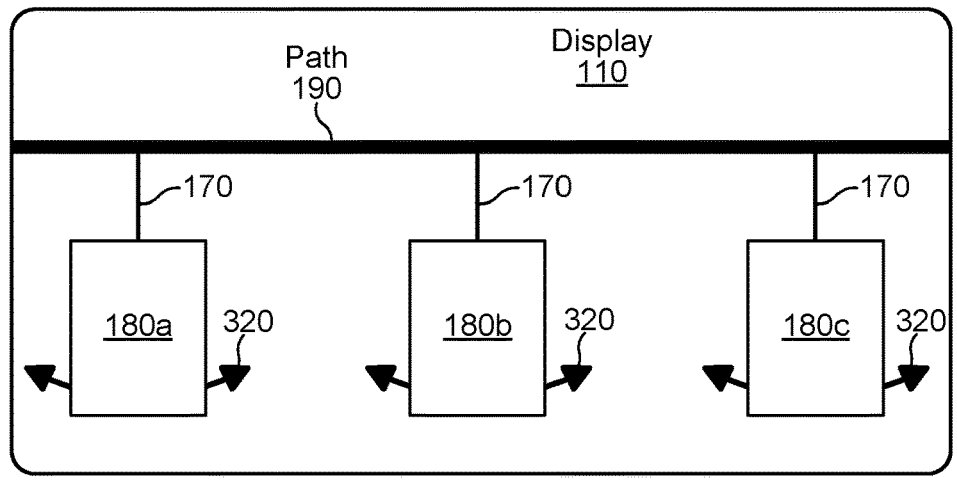
FIG. 5 illustrates an example decaying oscillatory motion of the objects of FIGS. 3 and 4.

FIG. 5 illustrates an example decaying oscillatory motion 320 of the objects of FIGS. 3 and 4. In FIG. 5, the in-process translational motion 310 illustrated in FIG. 4 may be complete, resulting in objects 180a, 180b, and 180c being displayed (e.g., the translation 310 from FIG. 4 has resulted in object 180d moving off-screen and object 180a moving on-screen). The decaying oscillation 320 in FIG. 5 includes a back-and-forth rotational motion (as indicated by the arrows connected to the objects 180a, 180b, and 180c), and an amplitude of the decaying oscillation 320 may decrease with time.

Figure 6:
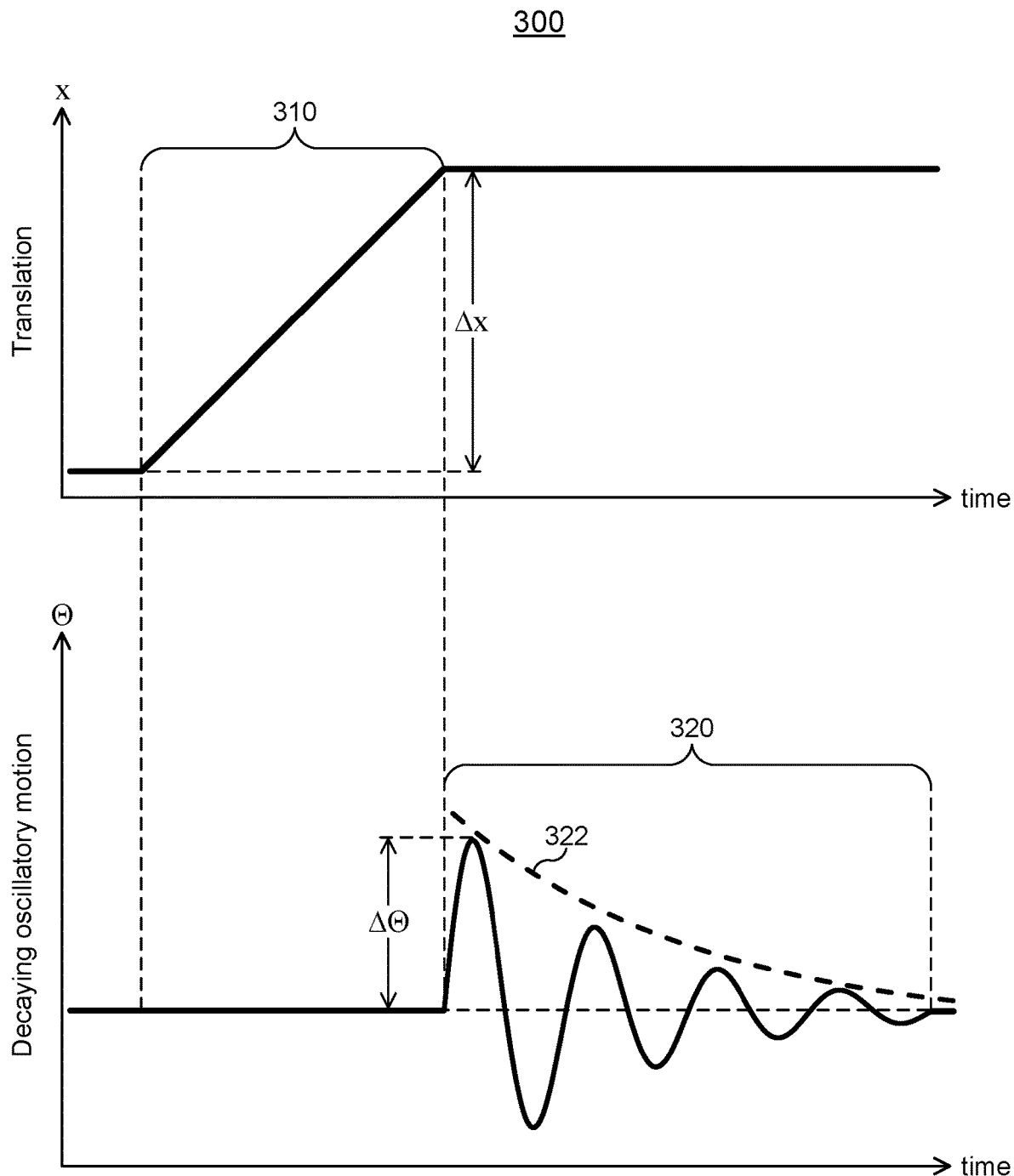
FIG. 6 illustrates an example motion that includes a translational motion and a decaying oscillatory motion.
Figure 7:
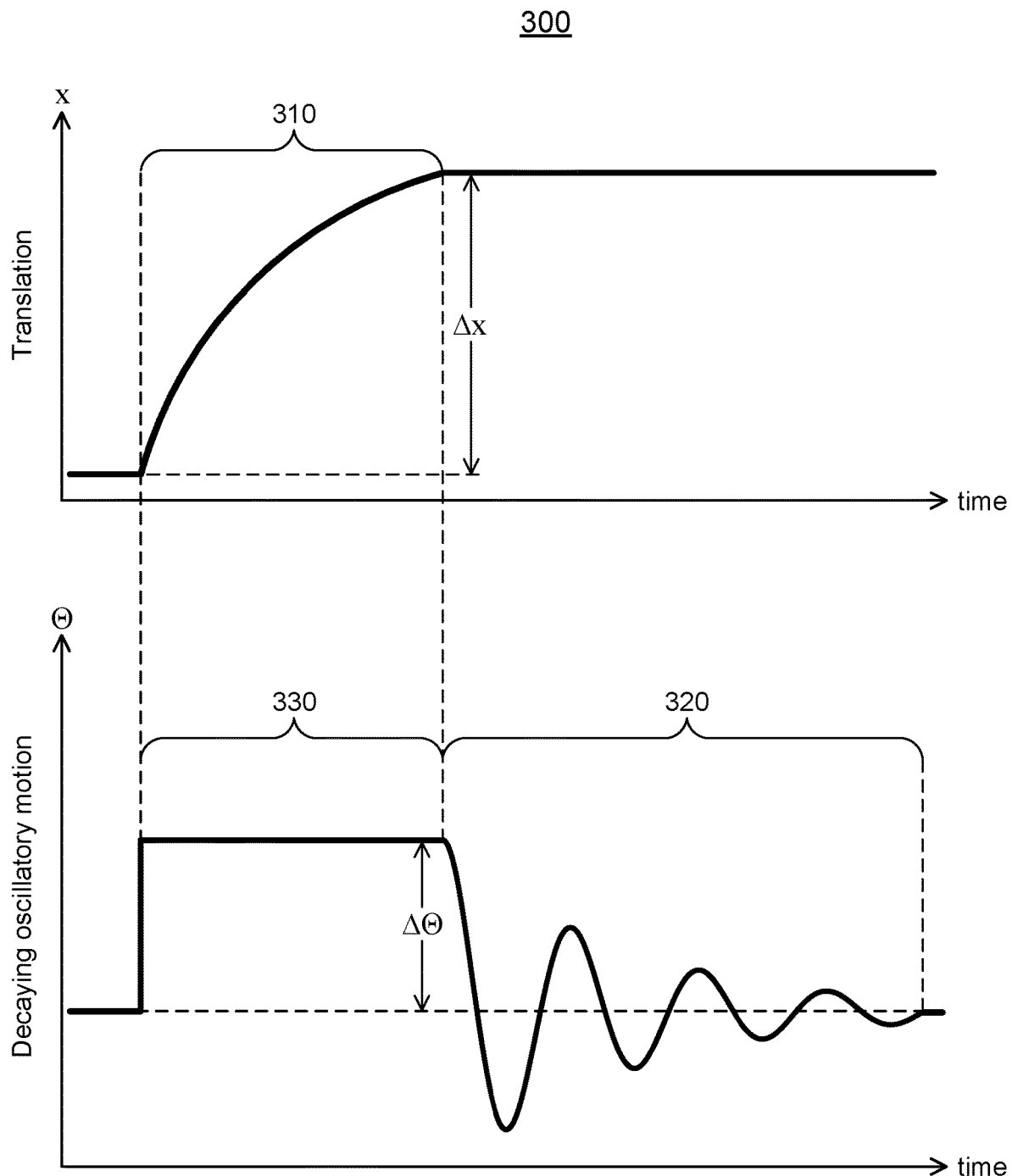
FIG. 7 illustrates an example motion that includes a translational motion, a decaying oscillatory motion, and an initial offset.

FIG. 6 illustrates an example motion 300 that includes a translational motion 310 and a decaying oscillatory motion 320. The upper graph in FIG. 6 represents the translation 310, and the x axis of the translation graph may correspond to a position of objects 180 along a path 190. A translational motion 310 may include a motion that varies with time approximately linearly, exponentially, parabolically, or monotonically, or that varies with time in any other suitable manner. The translation 310 in FIG. 6 is linear with time and represents a total change in position of $\Delta x$ for objects 180 along a path 190. For example, the change in the position of object 180c from FIG. 3 to FIG. 5 may correspond to a $\Delta x$ change in position along the path 190. A translation 310 with linear time dependence may correspond to constant-velocity motion in which one or more objects 180 move along a path 190 with an approximately constant speed over a time interval of the translation 310. The translation 310 in FIG. 7 is curved with an approximately parabolic or exponential variation of position with time. The translation 310 in FIG. 7 corresponds to a motion in which an object 180 moves with an initial relatively high speed and then gradually slows down, until the object 180 stops translating after moving a distance of $\Delta x$ along a path 190.

The lower graph in FIG. 6 represents a decaying oscillation 320, and the vertical axis of the oscillation graph may correspond to an angle of objects 180 (e.g., an angle of back-and-forth rotational motion). A decaying oscillation 320 may include any suitable motion (e.g., rotation, translation, shear, or scaling), and an oscillation graph may include a vertical axis plotted in terms of angle, position, amount of shear, size, or any other suitable parameter. The decaying oscillation 320 in FIG. 6 begins with a maximum amplitude of ΔΘ, and the amplitude of the oscillation decreases with time, which corresponds to a decaying oscillation. The decaying oscillation 320 has a sinusoidal variation with time, and the dashed line 322 is a decaying envelope function that corresponds to the decrease in amplitude of the oscillation with time. A decaying oscillation 320 may be expressed as a function Osc(t)=[Oscillating function]×[Decaying function], where the oscillating function may be any suitable function that varies periodically with time (e.g., sine, cosine, square wave, triangle wave), and the decaying envelope function 322 may be any suitable function with an amplitude that decreases monotonically with time (e.g., linear, quadratic, or exponential). For example, the decaying oscillation 320 in FIG. 6 may include a product of (i) a sinusoidal motion and (ii) a decaying exponential motion. In this case, the decaying oscillation 320 may be expressed as $Osc(t)=\Delta\Theta \sin(\omega t)\times e^{-kt}$, where ΔΘ is the initial amplitude of oscillation, ω is the radial frequency of the sinusoidal oscillation, and k is a decay constant that determines how fast the amplitude of the envelope function 322 decreases with time (e.g., a higher value of k corresponds to a faster decrease in the amplitude of the envelope function).

In particular embodiments, a motion 300 that includes a translational motion 310 and a decaying oscillatory motion 320 may be applied to one or more objects 180 so that the decreasing oscillatory motion 320 occurs after completion of the translational motion 310. In FIG. 6, the translational motion 310 is applied first, and then, the decaying oscillatory motion 320 is applied after the translation motion 310 is completed and the objects 180 have translated a distance of Δx. In other embodiments, a translational motion 310 and a decaying oscillatory motion 320 may overlap at least partially in time. For example, once some amount (e.g., 80%) of the translational motion 310 is complete, the decaying oscillatory motion 320 may be initiated.

In particular embodiments, a computing device 100 may be configured to determine a speed associated with a user input 200. For example, the user input 200 may correspond to a movement along a display 110, and the computing device 100 may determine a speed of the movement along the display device. The resulting motion 300 of the objects 180 on the display 110 may be determined based on the speed of the movement. For example, the speed or amplitude of a translational motion 310 may be approximately proportional to the speed associated with the user input 200. A larger speed of movement may result in a faster speed of a translational motion 310 or a greater distance Δx of translation along a path 190. A user may apply a first touch gesture 160 that moves across a display 110 at a speed of 60 cm/s, and the resulting translation 310 may translate the objects 180 a distance of 30 cm at a speed of 100 cm/s. The user may then apply a second touch gesture 160 with a slower speed of 30 cm/s, and the resulting translation 310 may translate the objects 180 a distance of 15 cm at a speed of 50 cm/s. As another example, the starting amplitude of a decaying oscillatory motion 320 may be approximately proportional to the speed associated with the user input 200. A larger speed of movement may result in a greater starting amplitude of a decaying oscillatory motion 320. For the 60-cm/s touch gesture 160 discussed above, the starting rotational amplitude ΔΘ of the objects 180 may be 50°, and for the 30-cm/s touch gesture 160, the starting rotational amplitude ΔΘ of the objects 180 may be 25°. Additionally or alternatively, a decaying oscillatory motion 320 may include a scaling motion in which the size of the objects 180 alternately increase and decrease. For the 60-cm/s touch gesture 160, an initial magnification of 50% may be applied to the objects 180, and for the 30-cm/s touch gesture 160, the initial magnification of the objects 180 may be 25%.

FIG. 7 illustrates an example motion 300 that includes a translational motion 310, a decaying oscillatory motion 320, and an initial offset 330. The initial offset 330 may correspond to the decaying oscillatory motion 320 and may represent an initial position applied to each of the objects 180 prior to initiation of the decaying oscillatory motion 320. In FIG. 7, the initial offset 330 may represent an initial angular offset of the objects 180 by an angle ΔΘ, and the initial offset 330 is applied to the objects 180 approximately at the time the translation 310 begins. In FIG. 4, an initial angular offset of ΔΘ is applied to the objects 180 while they are undergoing the translational motion 310. An initial offset 330 may be applied in any suitable direction or orientation. For example, in FIG. 4, the initial angular offset of ΔΘ is applied in a direction opposite the direction of the translation 310 so that the objects 180 appear to "swing back" as they are translated forward. In other embodiments, the objects 180 may rotate forward in the direction of the translation 310. As another example, for a decaying oscillatory motion 320 that includes scaling the size of the objects (e.g., alternately magnifying and shrinking the objects), the initial offset 330 may include an increase or decrease in size of the objects 180 while they undergo a translation 310.

Figure 8:
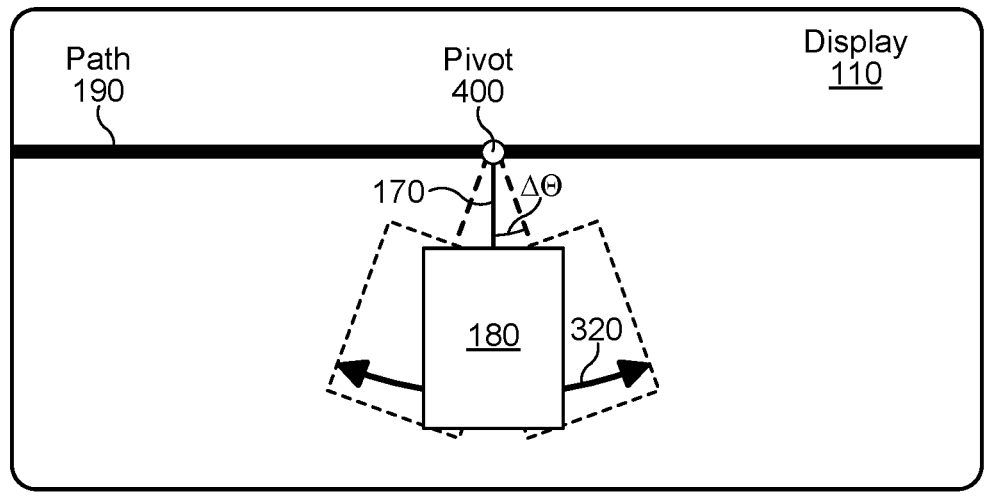
FIG. 8 illustrates an example decaying oscillatory motion that includes a back-and-forth rotational motion about a pivot point.

FIG. 8 illustrates an example decaying oscillatory motion 320 that includes a back-and-forth rotational motion about a pivot point 400. The decaying oscillatory motion 320 in FIG. 8 is similar to that illustrated in FIG. 5. The object 180 in FIG. 8 may rotate back-and-forth with an initial amplitude of ΔΘ, and the amplitude of the oscillation may decrease with time. A pivot 400 may be a fixed point or line about which an object 180 undergoing a decaying oscillatory motion 320 rotates, translates, or otherwise moves or changes, and a pivot 400 may be referred to as an origin of the decaying oscillatory motion 320. In FIG. 8, the rotational motion of the object 180 is centered at the pivot 400, and the object 180 rotates about the pivot 400. Additionally, the connector 170 may remain fixed to the object 180 and may also rotate about the pivot 400. In FIG. 8, the pivot point 400 is located along the path 190 at a location where the connector 170 meets the path 190. A pivot point 400 may have any suitable location, such as for example, along a path 190, along a connector 170, or within an object 180 (e.g., at a center, edge, or corner of an object 180).

Figure 9:
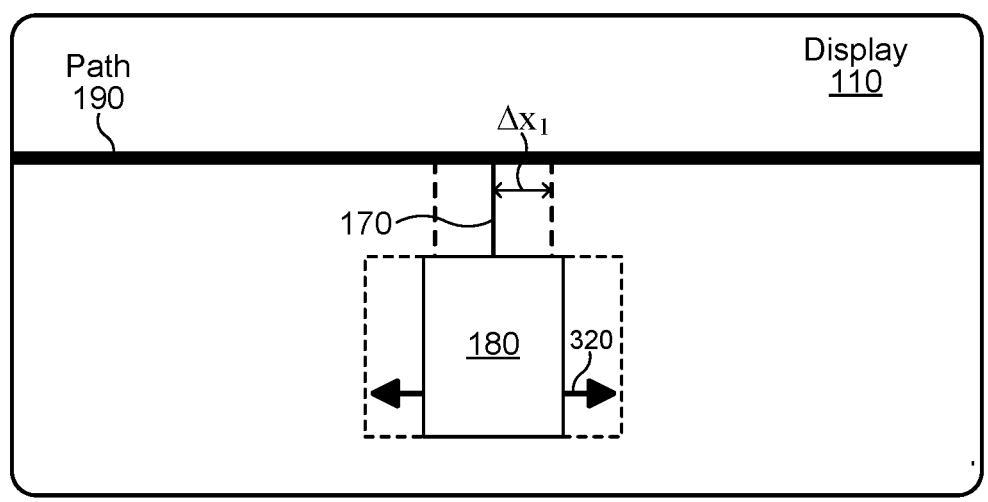
FIG. 9 illustrates an example decaying oscillatory motion that includes a back-and-forth translational motion.

FIG. 9 illustrates an example decaying oscillatory motion 320 that includes a back-and-forth translational motion. The object 180 in FIG. 9 may move back-and-forth with an initial amplitude of $\Delta x_1$, and the amplitude of the oscillation may decrease with time. The solid-line connector 170 may be referred to as a pivot line about which the object 180 moves back-and-forth.

Figure 10:
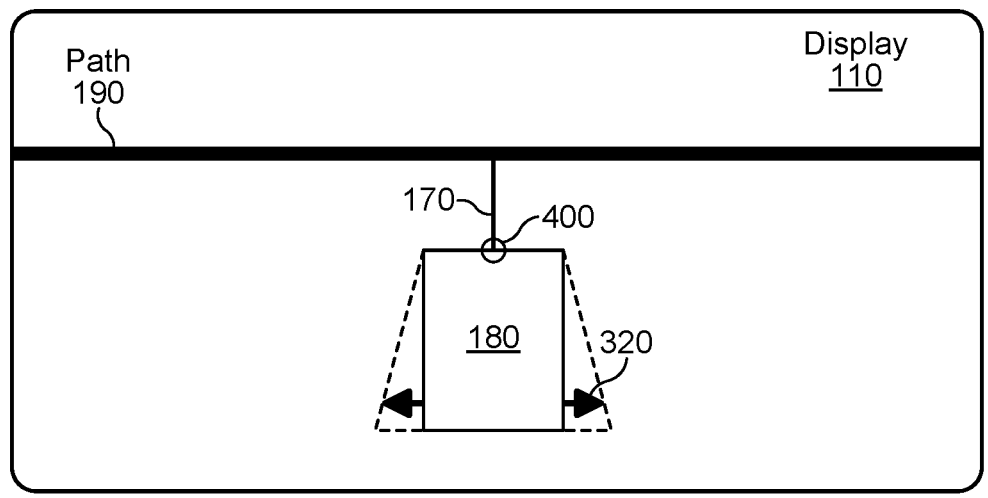
FIG. 10 illustrates an example decaying oscillatory motion that includes a back-and-forth shearing motion.

FIG. 10 illustrates an example decaying oscillatory motion 320 that includes a back-and-forth shearing motion. A shearing motion may refer to a motion in which an object 180 is skewed so that parts of the object 180 move laterally with respect to other parts of the object 180. In FIG. 10, the object 180 undergoes a horizontal shearing motion about the pivot 400. The upper edge of the object 180 remains stationary, while the bottom edge of the object 180 moves back-and-forth horizontally. While undergoing the shearing motion, the object is skewed back-and-forth from its original rectangular shape into a parallelogram shape. The pivot point 400 for a shearing motion may have any suitable location. For example, the pivot 400 may be located near the center of an object 180, and the top and bottom edges may move in opposite directions while undergoing the shearing motion.

Figure 11:
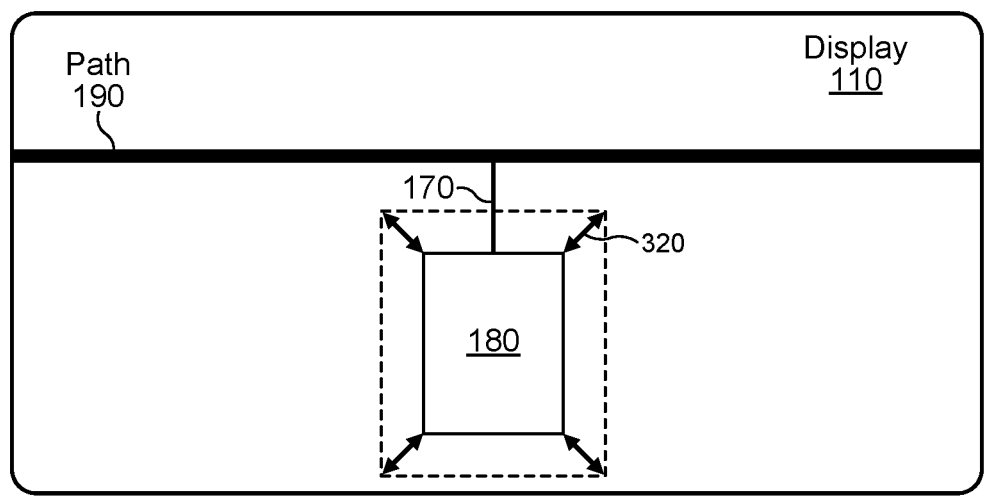
FIG. 11 illustrates an example decaying oscillatory motion that includes a scaling motion.

FIG. 11 illustrates an example decaying oscillatory motion 320 that includes a scaling motion. A scaling motion may include an oscillation of the size of an object 180 in which the size of the object 180 alternately increases and decreases with time. The amount of magnification or demagnification of the object 180 may decrease with time until the object 180 returns to its original size. The scaling of an object 180 may be uniform across the object, as illustrated in FIG. 11 where the object 180 increases in size uniformly in the vertical and horizontal directions. Alternatively, the scaling of an object 180 may be nonuniform where the amount of scaling is different along two directions. For example, the scaling of an object 180 may have different amplitudes along the vertical and horizontal directions. As another example, the scaling of an object 180 may be primarily in the horizontal direction, while the size of the object remains approximately fixed in the vertical direction. As another example, the scaling of an object 180 may be negative along a particular direction (e.g., the horizontal direction) so that while undergoing the scaling motion the object 180 is reversed to form a mirror image of itself.

In particular embodiments, a decaying oscillatory motion 320 may include one or more of rotation (as illustrated in FIG. 8), translation (as illustrated in FIG. 9), shearing (as illustrated in FIG. 10), and scaling (as illustrated in FIG. 11). For example, a decaying oscillatory motion 320 may include one of the motions: rotation, translation, shearing, and scaling. As another example, a decaying oscillatory motion 320 may include any suitable combination of two or more of the motions: rotation, translation, shearing, and scaling.

Figure 12:
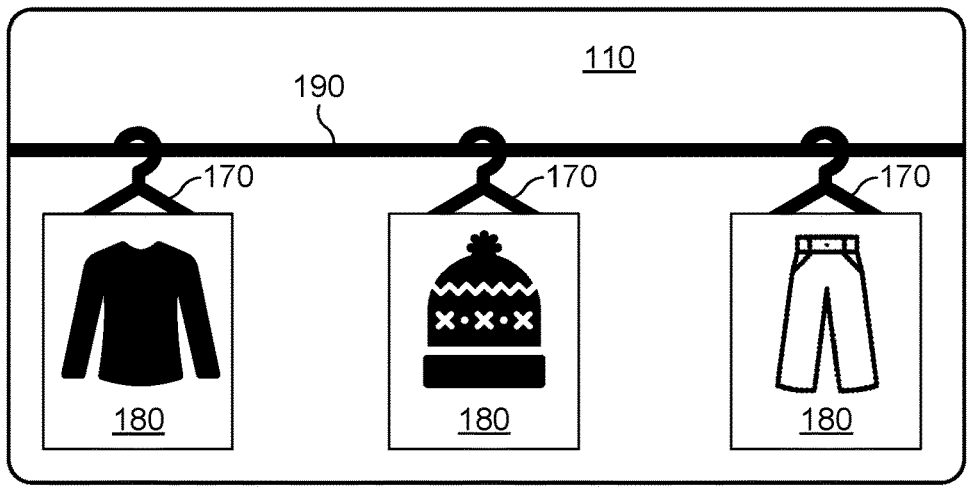
FIGS. 12-14 each illustrates an example display on which various objects are displayed.
Figure 13:
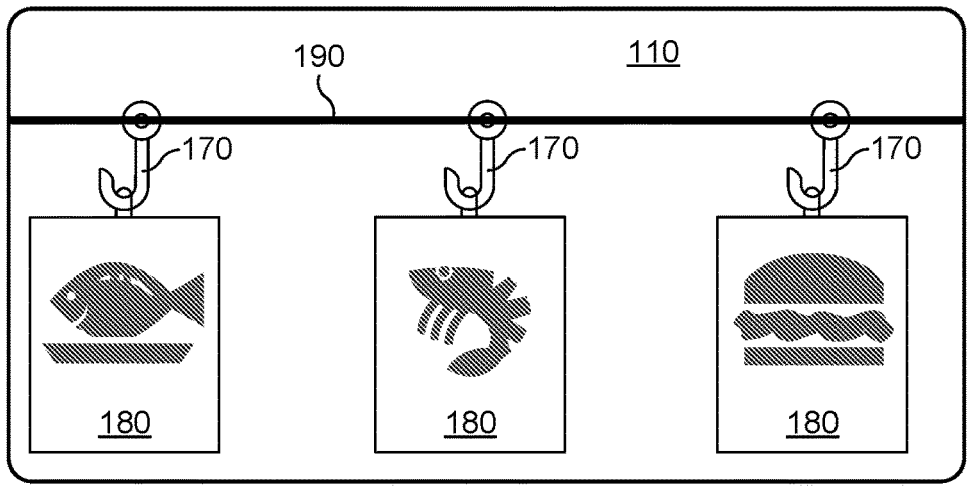

FIGS. 12-14 each illustrates an example display 110 on which various objects 180 are displayed. FIG. 12 may be part of a website for a clothing company, FIG. 13 may be part of a website for a restaurant, and FIG. 14 may be part of a website for a cocktail lounge. A user may interact with each of the displays 110 by applying a user input 200, and the objects 180 may undergo a motion 300 that includes a translation 310 and a decaying oscillation 320. In particular embodiment, each of the objects 180 displayed on a display 110 may include an image. Additionally, each of the objects 180 may be connected by a connector 170 to a line displayed on the display 110, where the line corresponds to the path 190 along which the objects 180 are translated across the display 110. The line in each of FIGS. 12 and 13 corresponds to the path 190 along which the objects 180 are translated. In FIG. 14, the path 190a is not visible on the display 110 (as illustrated by the dashed line), and the display 110 does not include an image of a line that corresponds to the path 190a. In FIG. 12, each of the connectors 170 is an image of a clothes hanger that connects an object 180 to the line corresponding to the path 190. In FIG. 13, each of the connectors 170 is an image of a hook that connects an object 180 to the line corresponding to the path 190. In FIG. 14, no connectors are present on the display 110.

Figure 15:
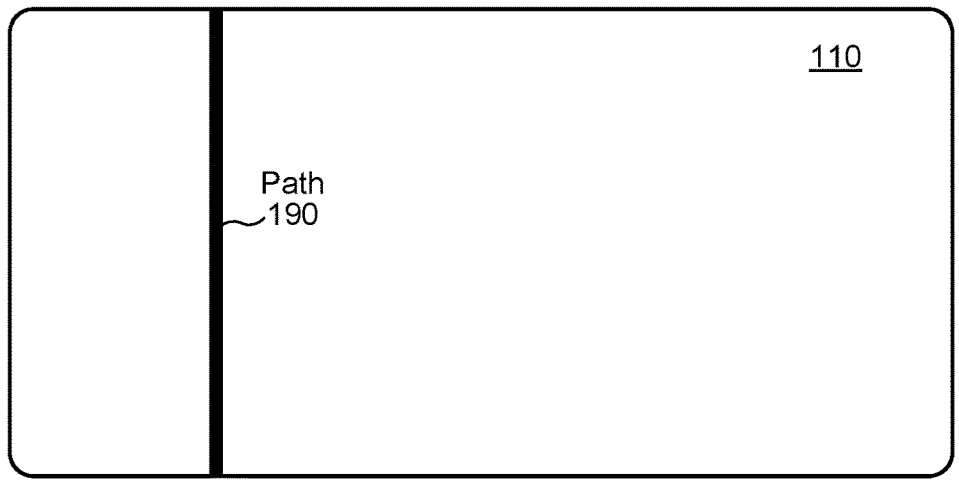
FIGS. 15-17 each illustrates an example display that includes an example path along which objects may travel.
Figure 16:
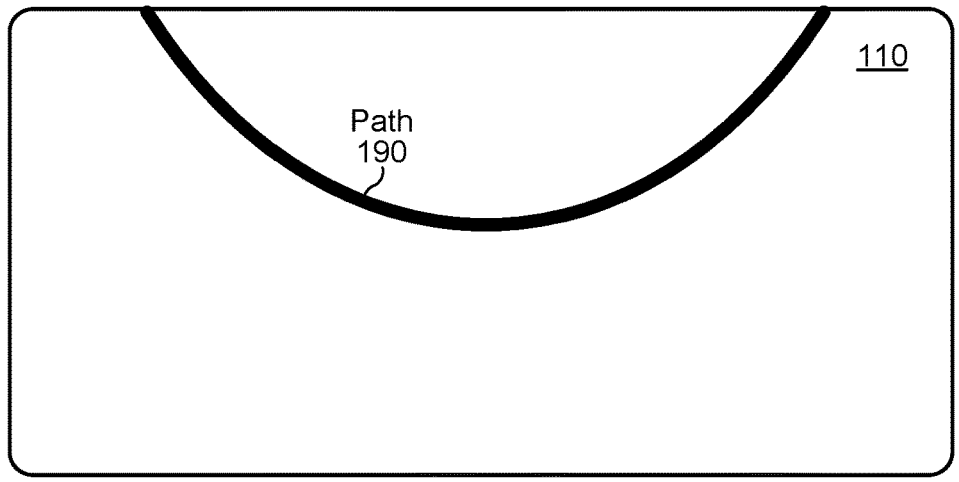
Figure 17:
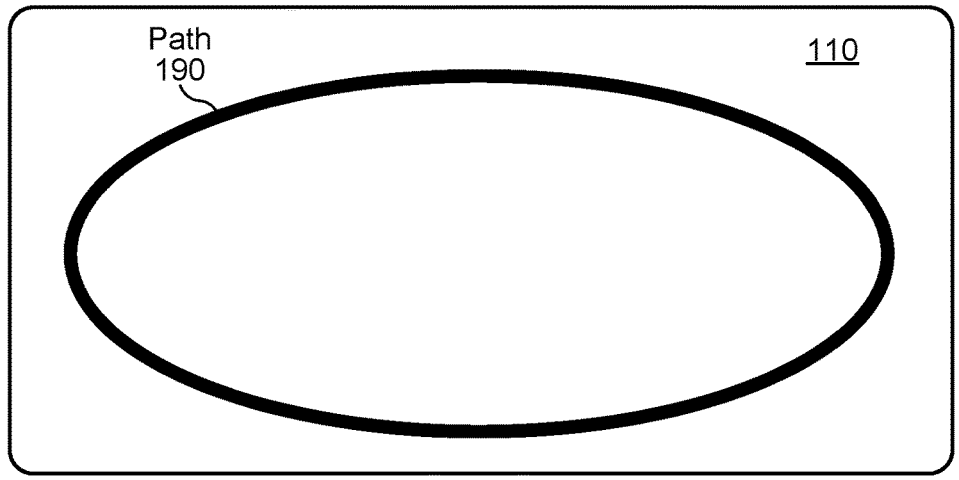

FIGS. 15-17 each illustrates an example display 110 that includes an example path 190 along which objects 180 may travel. A path 190 may be oriented in any suitable direction (e.g., horizontal, vertical, or angled) and may have any suitable shape (e.g., straight line, curved arc, or closed curve). The path 190 in each of FIGS. 1-5 and 8-14 is a straight line with a horizontal orientation, and a translation 310 may cause the associated objects 180 to move along a horizontal direction. The path 190 in FIG. 15 is a straight line with a vertical orientation, and a translation 310 may cause associated objects 180 to move along a vertical direction. The path 190 in FIG. 16 is a curved arc resembling a parabola, and objects 180 associated with the path 190 may be translated along a corresponding parabolic route. The path 190 in FIG. 17 is a closed curve resembling an ellipse, and objects 180 associated with the path 190 may be translated along a corresponding elliptical route.

In particular embodiments, objects 180 displayed on a display 110 may be part of a set of objects 180. For example, a set of objects 180 may include approximately 50 objects 180, and at any given time, approximately five of the objects 180 may be displayed on a display 110. In the example of FIG. 2, the set of objects 180 includes seven objects (objects 180a through 180g), and three objects (objects 180c, 180d, 180e) are displayed on the display 110. When a translation 310 is applied to the objects 180 on a display 110, (i) an object 180 that reaches a first end of a path 190 may be removed from view on the display 110 and (ii) a new object 180 may be added to view on the display 110 near a second end of the path 190, where the first and second ends are located at opposite ends of the path 190. The first and second ends of a path 190 may be located at different edges of a display 110 (e.g., at the left and right edges, as illustrated in FIGS. 1-5, or at the top and bottom edges, as illustrated in FIG. 15), or the first and second ends of a path 190 may be located at the same edges of a display 110 (as illustrated in FIG. 16). In FIG. 4, object 180e from FIG. 3 has been removed from view after reaching the right end of the path 190, and object 180b has moved on-screen and has been added near the left end of the path 190. In FIG. 5, object 180d from FIG. 4 has been removed from view after reaching the right end of the path 190, and object 180a has been added near the left end of the path 190. To remove an object 180 from view on a display 110, the object 180 may be removed instantly, may fade away from view, or may be removed in parts as it is translated off an edge of the display 110. Similarly, to add an object 180 to view on a display 110, the object 180 may be added instantly, may fade into view, or may be added in parts as it is translated over an edge of the display 110. For example, object 180b in FIG. 4 is in the process of being added to view as it is translated over the left edge of the display 110.

In particular embodiments, a set of objects 180 may be displayed in a cyclical manner. Displaying objects 180 in a cyclical manner may be referred to as cyclical scrolling, continuous scrolling, circular scrolling, repeated scrolling, or infinite scrolling. Instead of stopping scrolling when the beginning or end of the set of objects is reached, the objects are wrapped around so that the first object follows the last object of the set of objects (or vice versa). For cyclical scrolling, a set of objects 180 may include N objects 180, where N is a positive integer greater than or equal to three. The N objects may include a first object 180, a second object 180, and a Nth object 180, and the objects 180 may be arranged in order from the first object to the Nth object 180. When a translation 310 is applied to the objects 180 in a first direction, the first object follows the second object, and the Nth object follows the first object. Additionally, when a translation 310 is applied in a direction opposite the first direction, the order is reversed so that the first object follows the Nth object, and the second object follows the first object. With cyclical scrolling in the first direction, when the first object of the set is reached, instead of halting the scroll operation, the Nth object is wrapped around so that the scrolling continues with the Nth object appearing on-screen and following the first object (also, a (N−1)th object may follow the Nth object). Similarly, with cyclical scrolling in the opposite direction, when the Nth object is reached, instead of halting the scroll operation, the first object is wrapped around so that the scrolling continues with the first object appearing on-screen and following the Nth object, and the second object following the first object. For example, the set of seven (N=7) objects 180*a* through 180*g* in FIG. 2 may be displayed in a cyclical manner on the display 110. Object 180*a* may be referred to as the first object, object 180*b* may be referred to as the second object, and object 180*g* may be referred to as the Nth (or seventh) object. If the objects 180 are translating from left to right, then the first object (180*a*) follows the second object (180*b*), and the Nth object (180*g*) wraps around and follows the first object (180*a*). Additionally, the (N−1)th object (1800 follows the Nth object (180*g*). Similarly, if the objects 180 are translating in the opposite direction from right to left, the first object (180*a*) wraps around and follows the Nth object (180*g*), and the second object (180*b*) follows the first object (180*a*). Additionally, the third object (180*c*) follows the second object (180*b*).

In particular embodiments, a computing device 100 may be configured to receive a first user input 200 followed by a second user input 200, where the second user input 200 is received subsequent to the first user input 200. The first user input 200 may be directed approximately in a first direction (e.g., left to right). In response to the first user input 200, the computing device 100 may determine a first motion 300 of objects 180 on a display 110, where the first motion 300 includes a first translation 310 of the objects 180 in the first direction. The second user input 200, which may be received while the objects 180 are still undergoing the first translation 310, may be directed in approximately the same direction as the first user input 200. In response to the second user input 200, the computing device 100 may determine a second motion 300 corresponding to the second user input 200, where the second motion 300 includes a second translation 310 of the objects 180 in the first direction, and the computing device 100 may apply the second motion 300 to the objects 180. For example, prior to receiving the second user input 200, the objects 180 may be undergoing the first translation 310 with a gradually decreasing speed. When the second translation 310 is applied to the objects 180, the objects 180 may speed up and continue to translate across the display 110 in the same direction but at an initial speed that is faster than the speed prior to receiving the second user input 200. When the second translation 310 is complete, the computing device 100 may apply a decaying oscillatory motion 320 to the objects, where the decaying oscillatory motion 320 is determined based on the second user input 200.

In particular embodiments, a computing device 100 may be configured to receive (i) a first user input 200 directed approximately in a first direction and (ii) a second user input 200, subsequent to the first user input 200, in a direction approximately opposite the first direction. In response to the first user input 200, the computing device 100 apply a first translation 310 to the objects 180 in the first direction. In response to the second user input 200, the computing device 100 may determine a second motion 300 corresponding to the second user input 200, where the second motion 300 includes a second translation 310 of the objects 180 a direction opposite the first direction, and the computing device 100 may apply the second motion 300 to the objects 180. For example, prior to receiving the second user input 200, the objects 180 may be undergoing the first translation 310 in the first direction (e.g., in a left-to-right direction). When the second translation 310 is applied to the objects 180, the objects 180 may stop translating in the first direction and may reverse direction and move in the direction opposite the first direction (e.g., in a right-to-left direction). When the second translation 310 is complete, the computing device 100 may apply a decaying oscillatory motion 320 to the objects, where the decaying oscillatory motion 320 is determined based on the second user input 200.

Figure 18:
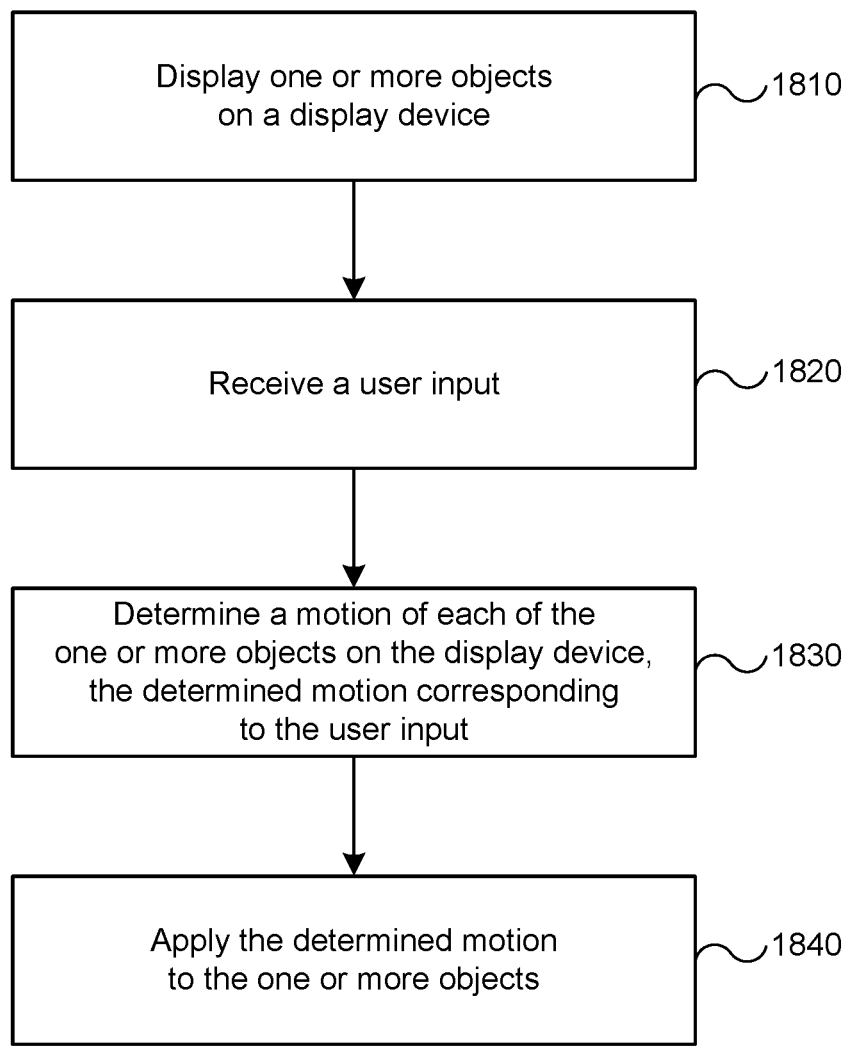
FIG. 18 illustrates an example method for applying a motion to one or more objects displayed on a display device.

FIG. 18 illustrates an example method 1800 for applying a motion 300 to one or more objects 180 displayed on a display device 110. The method 1800 may begin at step 1810, where one or more objects 180 are displayed on a display device 110. The display device 110, which may be part of a computing device 100, may be a liquid-crystal display (LCD), a light-emitting diode (LED) display, an organic LED display, an electroluminescent display, a quantum dot display, or any other suitable display device. At step 1820, a user input 200 is received. The user input 200 may correspond to a movement along the display device 110 and may be provided by a user of a computing device 100 that includes the display device 110. For example, the user input 200 may include a mouse movement, a touch-pad input, a stylus input, a touch-screen input, a hand movement, a head movement, an eye movement, or any other suitable user input. At step 1830, a motion 300 of each of the objects 180 is determined. For example, the display device 110 may be part of a computing device 100, and the computing device 100 may determine the motion 300. The determined motion 300 may correspond to the user input 200 and may include (i) a translation 310 of each of the objects 180 along a particular path 190 across at least a portion of the display device 110 and (ii) a decaying oscillatory motion 320 of each of the objects 180. At step 1840, the determined motion 300 is applied to the objects 180 on the display device 100, at which point the method 1800 may end. For example, a computing device 100 may send one or more instructions to the display device 100 to move the objects 180 on the display device 100 according to the determined motion 300.

Figure 19:
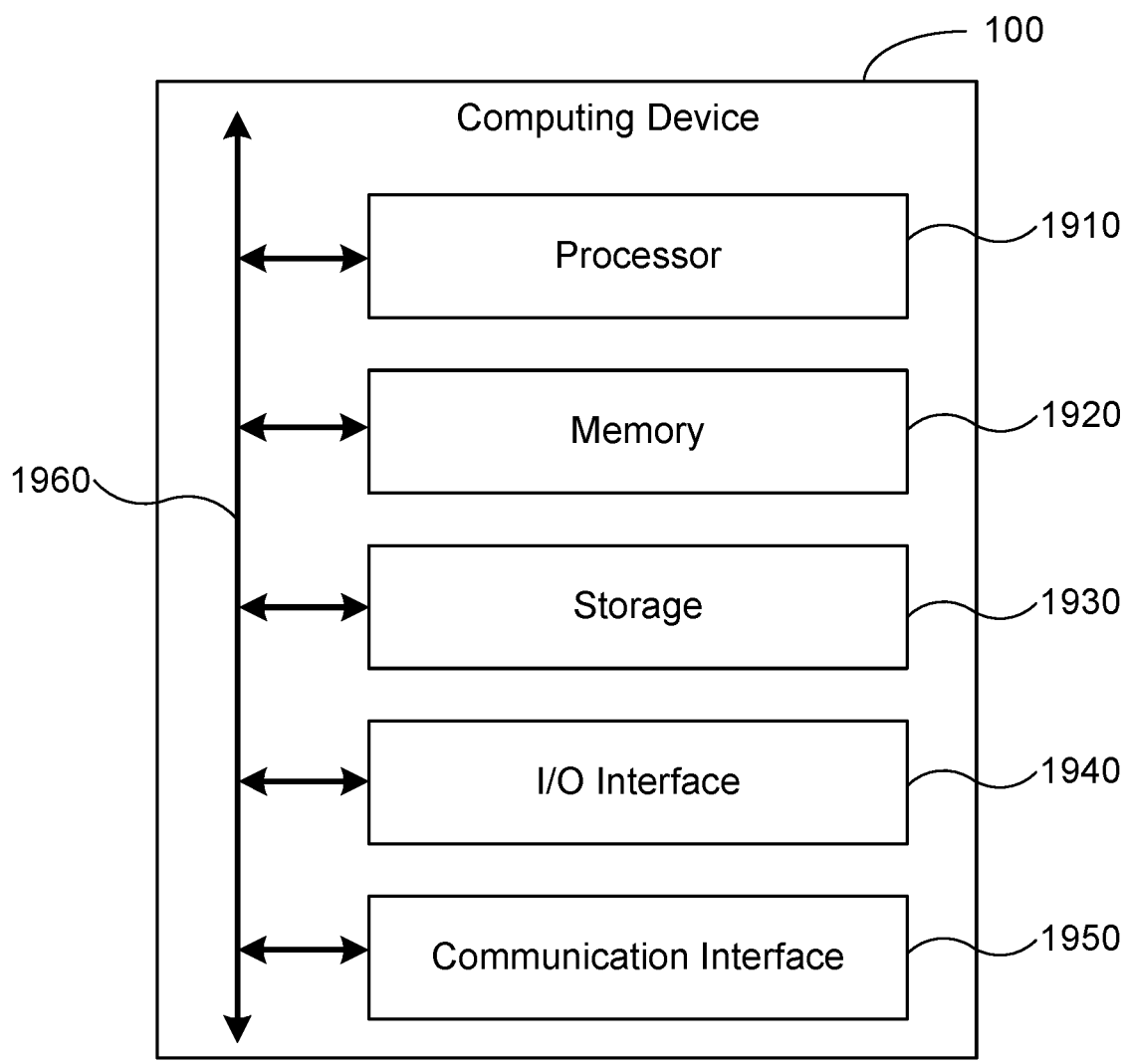
FIG. 19 illustrates an example computing device.

FIG. 19 illustrates an example computing device 100. In particular embodiments, one or more computing devices 100 may perform one or more steps of one or more methods described or illustrated herein. In particular embodiments, software running on one or more computing devices 100 may perform one or more steps of one or more methods described or illustrated herein or may provide functionality described or illustrated herein. A computing device 100 may include or may be referred to as a processor, a controller, a computing system, a computer system, a computer, a general-purpose computer, or a data-processing apparatus. Herein, reference to a computing device 100 may encompass one or more computing devices 100, where appropriate.

Computing device 100 may take any suitable physical form. As an example, computing device 100 may be an embedded computing device, a desktop computing device, a laptop or notebook computing device, a mainframe, a mesh of computing devices, a server, a tablet computing device, or any suitable combination of two or more of these. As another example, all or part of computing device 100 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display, head-mounted display, or virtual-reality headset. Where appropriate, one or more computing devices 100 may perform without substantial spatial or temporal limitation one or more steps of one or more methods described or illustrated herein. As an example, one or more computing devices 100 may perform in real time or in batch mode one or more steps of one or more methods described or illustrated herein. One or more computing devices 100 may perform at different times or at different locations one or more steps of one or more methods described or illustrated herein, where appropriate.

As illustrated in the example of FIG. 19, computing device 100 may include a processor 1910, memory 1920, storage 1930, an input/output (I/O) interface 1940, a communication interface 1950, or a bus 1960. Computing device 100 may include any suitable number of any suitable components in any suitable arrangement.

In particular embodiments, processor 1910 may include hardware for executing instructions, such as those making up a computer program. As an example, to execute instructions, processor 1910 may retrieve (or fetch) the instructions from an internal register, an internal cache, memory 1920, or storage 1930; decode and execute them; and then write one or more results to an internal register, an internal cache, memory 1920, or storage 1930. Processor 1910 may include one or more internal caches for data, instructions, or addresses. Processor 1910 may include one or more internal registers for data, instructions, or addresses. Where appropriate, processor 1910 may include one or more arithmetic logic units (ALUs); may be a multi-core processor; or may include one or more processors 1910.

In particular embodiments, memory 1920 may include main memory for storing instructions for processor 1910 to execute or data for processor 1910 to operate on. As an example, computing device 100 may load instructions from storage 1930 or another source (such as, for example, another computing device 100) to memory 1920. Processor 1910 may then load the instructions from memory 1920 to an internal register or internal cache. To execute the instructions, processor 1910 may retrieve the instructions from the internal register or internal cache and decode them. During or after execution of the instructions, processor 1910 may write one or more results to the internal register or internal cache. Processor 1910 may then write one or more of those results to memory 1920. One or more memory buses (which may each include an address bus and a data bus) may couple processor 1910 to memory 1920. Bus 1960 may include one or more memory buses. In particular embodiments, memory 1920 may include random access memory (RAM). Memory 1920 may include one or more memories 1920, where appropriate.

In particular embodiments, storage 1930 may include mass storage for data or instructions. As an example, storage 1930 may include a hard disk drive (HDD), flash memory, an optical disc, a magneto-optical disc, magnetic tape, a Universal Serial Bus (USB) drive, or a combination of two or more of these. Storage 1930 may include removable or non-removable (or fixed) media, where appropriate. Storage 1930 may be internal or external to computing device 100, where appropriate. In particular embodiments, storage 1930 may be non-volatile, solid-state memory. In particular embodiments, storage 1930 may include read-only memory (ROM). Where appropriate, storage 1930 may include one or more storages 1930.

In particular embodiments, I/O interface 1940 may include hardware, software, or both, providing one or more interfaces for communication between computing device 100 and one or more I/O devices. Computing device 100 may include one or more of these I/O devices, where appropriate. One or more of these I/O devices may enable communication or interaction between a person and computing device 100. As an example, an I/O device may include a keyboard, keypad, microphone, display 110, mouse 120, stylus 130, touch pad 140, camera 145, touch sensor, tablet, trackball, another suitable I/O device, or any suitable combination of two or more of these.

In particular embodiments, communication interface 1950 may include hardware, software, or both providing one or more interfaces for between computing device 100 and one or more other computing devices 100 or one or more networks. As an example, communication interface 1950 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. Communication interface 1950 may include one or more communication interfaces 1950, where appropriate.

In particular embodiments, bus 1960 may include hardware, software, or both coupling components of computing device 100 to each other. As an example, bus 1960 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 1960 may include one or more buses 1960, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computing device 100. As an example, computer software may include instructions configured to be executed by processor 1910.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computing device. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, or digital versatile discs (DVDs)), optical disc drives (ODDs), magneto-optical discs, magneto-optical drives, magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%. The term "substantially constant" refers to a value that varies by less than a particular amount over any suitable time interval. For example, a value that is substantially constant may vary by less than or equal to 20%, 10%, 1%, 0.5%, or 0.1% over a time interval of approximately 104 s, 103 s, 102 s, 10 s, 1 s, 100 ms, 10 ms, 1 ms, 100 μs, 10 μs, or 1 μs.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A method comprising:
    displaying one or more objects on a display device;
    receiving a user input corresponding to a movement along the display device;
    determining a motion of each of the one or more objects on the display device, the determined motion corresponding to the user input and comprising:
        a first motion comprising a translation of each of the objects along a particular path across at least a portion of the display device; and
        a second motion comprising a decaying oscillatory motion of each of the objects wherein an amplitude of the decaying oscillatory motion decreases with time and the decaying oscillatory motion comprises a product of (i) a sinusoidal motion and (ii) a decaying exponential motion; and
    applying the determined motion to the one or more objects displayed on the display device.

2. The method of claim 1, wherein the user input comprises a mouse movement, a touch-pad input, a stylus input, a touch-screen input, a hand movement, a head movement, or an eye movement.

3. The method of claim 1, wherein the particular path has a horizontal orientation, and the translation of the objects comprises a horizontal motion.

4. The method of claim 1, further comprising determining a speed of the movement along the display device, wherein the motion of the objects on the display device is determined based on the determined speed.

5. The method of claim 4, wherein a larger speed of the movement results in a faster speed and a greater distance of the translation of the objects along the particular path.

6. The method of claim 4, wherein a larger speed of the movement results in a greater starting amplitude of the decaying oscillatory motion.

7. The method of claim 1, wherein the decaying oscillatory motion comprises a back-and-forth rotational motion about a pivot point.

8. The method of claim 1, wherein the decaying oscillatory motion comprises a back-and-forth translational motion.

9. The method of claim 1, wherein the decaying oscillatory motion comprises a back-and-forth shearing motion.

10. The method of claim 1, wherein the decaying oscillatory motion comprises a scaling motion wherein a size of the object increases and decreases with time.

11. The method of claim 1, wherein the determined motion is applied to the one or more objects so that the decaying oscillatory motion occurs after completion of the translation of the objects along the particular path.

12. The method of claim 1, wherein the motion of the objects further comprises a third motion comprising an initial offset applied to each of the objects, the initial offset corresponding to the decaying oscillatory motion.

13. The method of claim 1, wherein the objects displayed on the display device are part of a set of objects, and the method further comprises, during the translation of the objects along the particular path:
removing from view on the display device an object that reaches a first end of the particular path; and
adding to view on the display device a new object from the set of objects, wherein the new object is added near a second end of the particular path, the second end opposite the first end.

14. The method of claim 1, wherein the set of objects comprises N objects, wherein N is a positive integer greater than or equal to three, wherein:
the N objects comprise a first object, a second object, and a Nth object, wherein the N objects are arranged in order from the first object to the Nth object; and
the N objects are displayed in a cyclical manner, wherein:
the translation of the objects is in a first direction along the particular path;
during the translation of the objects in the first direction along the particular path, the first object follows the second object, and the Nth object follows the first object; and
during a subsequent translation of the objects in a direction opposite the first direction, the first object follows the Nth object, and the second object follows the first object.

15. The method of claim 1, wherein:
the user input is a first user input, the movement along the display device is a first movement along the display device, and the translation of the objects is a first translation of the objects and is directed in a first direction; and
the method further comprises:
receiving, subsequent to the first user input, a second user input corresponding to a second movement along the display device in a same direction as the first movement;
determining another motion of the objects on the display device, the another motion corresponding to the second user input and comprising a second translation of the objects along the particular path in the first direction; and
applying the determined another motion to the objects displayed on the display device.

16. The method of claim 1, wherein:
the user input is a first user input, the movement along the display device is a first movement along the display device, and the translation of the objects is a first translation of the objects and is directed in a first direction; and
the method further comprises:
receiving, subsequent to the first user input, a second user input corresponding to a second movement along the display device in a direction opposite the first movement;
determining another motion of the objects on the display device, the another motion corresponding to the second user input and comprising a second translation of the objects along the particular path in a direction opposite the first direction; and
applying the determined another motion to the objects displayed on the display device.

17. The method of claim 1, wherein each of the one or more objects comprises an image, and each of the one or more objects is connected by a connector to a line displayed on the display device, the line corresponding to the particular path along the display device.

18. The method of claim 17, wherein the connector comprises an image of a clothes hanger or an image of a hook.

19. The method of claim 1, wherein the display device comprises a liquid-crystal display (LCD), a light-emitting diode (LED) display, an organic LED display, an electroluminescent display, or a quantum dot display.

20. The method of claim 1, wherein the decaying oscillatory motion is expressed with respect to time (t) as $\Delta\Theta \sin(\omega t) \times e^{-kt}$, wherein $\Delta\Theta$ is an initial amplitude of the decaying oscillatory motion, $\omega$ is a radial frequency of the sinusoidal motion, and k is a decay constant representing how fast the exponential motion decays.

21. A system comprising:
a display device;
one or more processors; and
a memory coupled to the processors comprising instructions executable by the processors, the processors being operable when executing the instructions to:
display one or more objects on the display device;
receive a user input corresponding to a movement along the display device;
determine a motion of each of the one or more objects on the display device, the determined motion corresponding to the user input and comprising:
a first motion comprising a translation of each of the objects along a particular path across at least a portion of the display device; and
a second motion comprising a decaying oscillatory motion of each of the objects wherein an amplitude of the decaying oscillatory motion decreases with time and the decaying oscillatory motion comprises a product of (i) a sinusoidal motion and (ii) a decaying exponential motion; and apply the determined motion to the one or more objects displayed on the display device.

22. One or more computer-readable non-transitory storage media embodying software that is operable when executed to:

display one or more objects on a display device;

receive a user input corresponding to a movement along the display device;

determine a motion of each of the one or more objects on the display device, the determined motion corresponding to the user input and comprising:

a first motion comprising a translation of each of the objects along a particular path across at least a portion of the display device; and a second motion comprising a decaying oscillatory motion of each of the objects wherein an amplitude of the decaying oscillatory motion decreases with time and the decaying oscillatory motion comprises a product of (i) a sinusoidal motion and (ii) a decaying exponential motion; and apply the determined motion to the one or more objects displayed on the display device.

* * * * *